United States Patent

Watanabe

Patent Number: 5,241,424
Date of Patent: Aug. 31, 1993

[54] FINE ACTUATOR

[75] Inventor: Mitsuru Watanabe, Hachioji, Japan

[73] Assignee: Konica Corporation, Tokyo, Japan

[21] Appl. No.: 727,112

[22] Filed: Jul. 9, 1991

[30] Foreign Application Priority Data

| Jul. 12, 1990 | [JP] | Japan | 2-184834 |
| Jul. 12, 1990 | [JP] | Japan | 2-184835 |
| Jul. 27, 1990 | [JP] | Japan | 2-200939 |

[51] Int. Cl.⁵ .............. G11B 7/12; G02F 1/09
[52] U.S. Cl. .................. 359/811; 359/813; 359/814; 359/822; 369/44.15; 369/44.16
[58] Field of Search ........ 369/44.15, 44.16, 44.14; 359/811, 813, 814, 823, 824, 822

[56] References Cited

U.S. PATENT DOCUMENTS

| 4,720,088 | 1/1988 | Tamura | 369/44.16 |
| 4,750,164 | 6/1988 | Nose | 369/44.15 |
| 4,794,580 | 12/1988 | Ikedo et al. | 369/44.16 |
| 4,927,235 | 5/1990 | Narumi | 359/814 |
| 5,018,836 | 5/1991 | Noda et al. | 369/44.16 |
| 5,068,844 | 11/1991 | Tanaka | 369/44.16 |
| 5,134,527 | 6/1992 | Cau | 369/44.16 |
| 5,161,067 | 11/1992 | Tomiyama et al. | 369/44.16 |

FOREIGN PATENT DOCUMENTS 139943  6/1986  Japan .............. 369/44.16

Primary Examiner—Paul M. Dzierzynski
Assistant Examiner—Kim-Kwok Chu
Attorney, Agent, or Firm—Finnegan, Henderson, Farabow, Garrett & Dunner

[57] ABSTRACT

An optical head for optically writing data onto a recording medium and reading the data from the recording medium. The optical head includes an optical lens holder; a driver for the holder which is located on a side of the holder; flat spring members for elastically supporting the holder in a horizontal direction; and other flat spring members for elastically supporting the holder in a vertical direction, and for creating a sandwiched area. At least a part of the spring members for supporting the holder in a horizontal direction is located within the sandwiched area of the other spring members.

7 Claims, 11 Drawing Sheets

FINE ACTUATOR

BACKGROUND OF THE INVENTION

The present invention relates to an fine actuator wherein a light beam is used for reading data from a recording medium and writing data onto it.

An example of a conventional fine actuator will be explained as follows, referring to drawings. FIG. 9 is a front view of a conventional fine actuator and FIG. 10 is a top view of the fine actuator shown in FIG. 10.

In the figures, the numeral 1 represents a base, and 2 represents a lens-holder that holds objective lens 3.

On both sides of the lens-holder 2, there are provided respectively first coil 4 and second coil 5 each consisting of a tracking coil and a focusing coil.

The numerals 6 and 7 represent the first magnetic circuit and the second magnetic circuit both provided on the base 1. In the magnetic gaps of these magnetic circuits, there are provided respectively the first coil 4 and the second coil 5 mentioned above.

The numerals 8 and 9 represent respectively the first supporting pole and the second supporting pole each provided on the back of each yoke of the first and second magnetic circuits 6 and 7 on the base 1.

The numerals 10 and 11 represent the first tracking leaf spring and the second tracking leaf spring each of which is fixed, at one end, on each of supporting poles 8 and 9 and is flexible in the direction of tracking.

The numeral 12 is a relay member to which the other end of each of the first and second tracking leaf springs is fixed.

The numerals 13 and 14 represent respectively the first focusing leaf spring and the second focusing leaf spring both being flexible in the focusing direction, and one end of each is fixed on the relay member 12 and the other end of each is fixed on the lens-holder 2.

Next, operations in the aforesaid arrangement will be explained. When focusing, an electric current is applied to coils of the first coil 4 and the second coil 5 from an unillustrated control circuit. Thereby, a thrust is generated in each of the first coil 4 and the second coil 5, causing the lens holder 2 to move in the direction of arrow F in FIG. 9 against the resilience of focusing leaf springs 13 and 14. When the supply of electric current is cut, the lens holder 2 returns to its original position.

Next, when conducting tracking, an electric current is applied to each tracking coil in the first coil 4 and the second coil 5 from an unillustrated control circuit. Thereby, a thrust is generated in each of the first coil 4 and the second coil 5, causing the lens holder 2 to move in the direction of arrow T in FIG. 10 against the resilience of focusing leaf springs 10 and 11. When the supply of electric current is cut, the lens holder 2 returns to its original position.

In an fine actuator having a constitution like those mentioned above, an optical axis for objective lens 3 is inclined very little and less friction is caused in operation, resulting in excellent characteristics of tracking and focusing.

Next, the second example of a conventional fine actuator will be explained, referring to FIGS. 19 and 20. In these drawings, parts or components which are the same as those in FIGS. 9 and 10 are given the same symbols and explanations for them will be omitted. Differences between the present example and the first example for a conventional fine actuator include the first focusing leaf spring 15 and the second focusing leaf spring 16. Each of these focusing leaf springs 15 and 16 has on its both edges respectively the through holes 15a and 15b, and 16a and 16b.

These provided holes 15a and 15b, and 16a and 16b contribute to lower the stiffness at both edges of the leaf spring and thereby to virtually eliminate resonance of a high order.

Recently, however, the trend for a small recording medium compels an optical disk apparatus employing a fine actuator like those mentioned above to be also small.

However, in the example of a conventional fine actuator having the constitution mentioned above, when a length of each of focusing leaf springs 13 and 14 is shortened for the purpose of smaller size, a length of each of tracking leaf springs 10 and 11, which are to be shorter than the focusing leaf spring is further shortened.

When the length of a spring is shortened, the stiffness of the spring is increased, which causes a fine actuator to be unable to secure a sufficient distance for its movement.

In order to overcome the problem mentioned above, the thickness of a spring can be reduced. However, existing thickness of a spring is as thin as several tens $\mu$m, which is very thin, and any thinner than this may adversely affect assembling work.

The invention has been devised in view of the aforesaid problem and its object is to provide a small-sized fine actuator.

Further, a fine actuator of this type is generally mounted on the top of an optical unit and is provided with a reading unit wherein a yoke having a magnetic driving circuit is provided with an objective lens unit having therein an induction coil that follows the aforesaid driving circuit through a supporting member that supports horizontally the objective lens unit so that it can move freely in the focusing direction. Thus track signals on the surface of an optical disk are subjected to reading/writing through the objective lens unit.

For example an induction coil which can follow direction X (track servo direction) and direction Z (focus servo direction) is provided on the side of the objective lens unit. Thus, a fine actuator that can follow a magnetic induction circuit on the yoke side is formed, and track signals on the surface of the optical disk can be sent to or received by the optical unit through an opening provided on the yoke. In this case, it is necessary to adjust finely inclination of the objective lens unit against the optical disk surface so that the objective lens unit can be focused without aberration on the optical disk surface.

For the requirement mentioned above, a conventional device has employed either one of the following systems.

(1) Spacer system
(2) Screw-tightening system

In the spacer system, in this case, spacer S (a flake) whose thickness is precisely controlled has been placed at each of three points between optical unit 111 and yoke 121 as shown in FIG. 23. In this way, inclination of yoke 121 against optical unit 111 has been adjusted by means of an optimum combination of spacers S each having a different thickness, thus, the inclination of objective lens unit 141 supported by supporting member 131 has been adjusted.

The screw-tightening system, on the other hand, has been constructed so that a protrusion of yoke 122 is inserted in recess 112 that is provided on the top of optical unit 111 and the protrusion is tightened together with the recess 112 by screws N at three points for adjustment, as shown in FIG. 24. Thus, the inclination of yoke 122 against optical unit 112 has been adjusted by controlling the tightening force for each screw N, and the inclination of objective lens unit 142 supported by supporting member 132 has been adjusted.

In the mechanism for adjusting inclination of the objective lens unit in a conventional optical disk device, the spacer system (1) has not been free from a disadvantage that it is troublesome to handle because the spacer is very thin and very small. Further, workability thereof has been very poor because of the necessity for adjusting by means of an optimum combination of spacers each having a different thickness.

On the other hand, the screw-tightening system has a disadvantage that intensive stress is generated on each of a yoke and an optical unit, though it only requires adjustment for tightening of three screws and it is free from troublesome handling as in the spacer system. In particular, optical parts in an optical unit, even when they have minute strains as small as the size of a wavelength, are feared to affect a signal-detection function adversely, which is undesirable.

In view of the aforesaid point, the second object of the invention is to provide an optical disk device provided with an inclination adjustment mechanism which only requires simple adjustment and which does not cause stress on an optical unit.

SUMMARY OF THE INVENTION

In the first example and the second example of the invention for attaining the first object, there are provided a lens holder for holding an objective lens, the first and second coils attached on both sides of the lens holder, the first and second magnetic circuits provided on a base and the first and second coils of the magnetic circuits being positioned in a magnetic gap, the first and the second focusing leaf springs one end of each of which is fixed respectively on the top surface and the bottom surface of the lens holder, a relay member that is fixed on the other ends of the first and second focusing leaf springs and thereby connecting them, the first and the second tracking leaf springs one end of each of which is attached on one of the sides of the relay member, and the first and the second supporting poles to which other ends of the first and the second tracking leaf springs are attached so that the first and the second poles are provided on the base between the first and the second magnetic circuits and at least one part of the first and the second tracking leaf springs is positioned between the first focusing leaf spring and the second focusing leaf spring.

In the third example, there are provided a lens holder for holding an objective lens, the first and second coils attached on both sides of the lens holder, the first and second magnetic circuits provided on a base and the first and second coils of the magnetic circuits being positioned in a magnetic gap, the first and the second focusing leaf springs one end of each of which is fixed respectively on the top surface and the bottom surface of the lens holder, a relay member that is fixed on the other ends of the first and second focusing leaf springs and thereby connecting them, the first and the second tracking leaf springs one end of each of which is attached respectively on one of the sides of the relay member, and the first and the second supporting poles to which other ends of the first and the second tracking leaf springs are attached so that the first and the second poles are provided on the base between the first and the second magnetic circuits and at least one part of the first and the second tracking leaf springs is positioned between the first focusing leaf spring and the second focusing leaf spring when tracking.

Further, in the fourth example through the seventh example, there are provided a lens holder for holding an objective lens, the first and the second coils to be attached on both sides of the lens holder, the first and the second magnetic circuits provided on the base whose first and second coils are arranged in the magnetic gap, the first and the second supporting poles provided between the first magnetic circuit and the second magnetic circuit on the base, the first and the second tracking leaf springs whose ends are fixed respectively on the first and the second supporting poles and are flexible in the tracking direction, a relay member on which other ends of the first and the second tracking leaf springs are fixed, and the first and the second focusing leaf springs flexible in the focusing direction one end of each of which is fixed on the relay member and the other end of each of which is fixed at a position near the center of gravity of the lens holder, and each of the first and second focusing leaf springs is provided thereon with cut-outs at locations facing the edge of the lens holder and the edge of the relay member.

On the fine actuator in each of the first example through the third example, the first supporting pole and the second supporting pole are provided between the first magnetic circuit and the second magnetic circuit on the base. Therefore, the first and the second tracking leaf springs do not interfere with the first and the second magnetic circuits. Thus, each of the first and the second tracking leaf springs can be of the necessary length.

Further, in the case of the fine actuator in the fourth example through the seventh example, the other end of a focusing leaf spring can be fixed at the point in the vicinity of the center of gravity of a lens holder. Therefore, it is possible to secure a sufficient length of a focusing leaf spring.

Further, due to cutouts provided at both ends of a focusing leaf spring, it does not interfere with a lens, and in addition to that, stiffness of both end portions of the focusing leaf springs is reduced, preventing the high-order resonance.

The eighth example of the invention for achieving the second object mentioned above is an optical disk device provided with a yoke placed on the top of an optical unit and with a head portion in which an objective lens unit equipped with an inductance coil that follows a magnetic driving circuit provided on the yoke is supported by a supporting member movable only to focusing direction, wherein an inclination-adjusting means is provided between the supporting member and the yoke and the inclination of the objective lens unit can be adjusted only by controlling the force of tightening screws between the supporting member and the yoke.

DETAILED DESCRIPTION OF THE INVENTION

Figure 1:
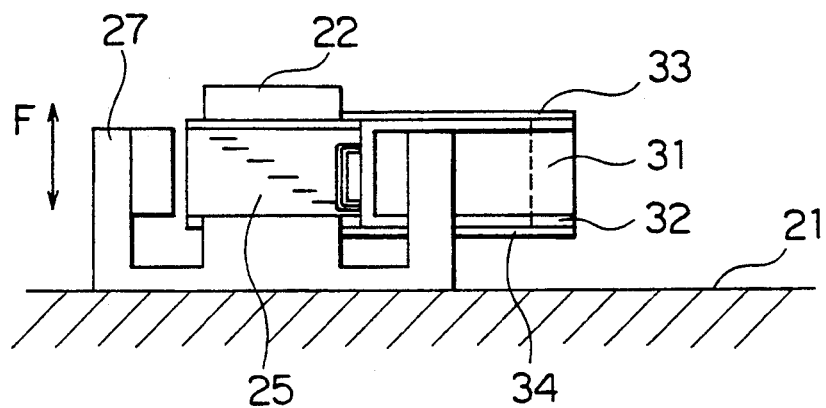
FIG. 1 is a structural front view illustrating the first example of the invention.

The first example of the invention will be explained, referring to FIG. 1 and FIG. 2. In the figures, 21 is a base and 22 is a lens holder that holds objective lens 23 from which a laser beam is directed to an unillustrated recording medium.

On both sides of the lens holder 22, there are provided the first and the second coils 24 and 25 each being composed of a tracking coil and a focusing coil.

The numerals 26 and 27 represent respectively the first and the second magnetic circuits provided on base 21. In the magnetic gap formed by these magnetic circuits, the first and the second coils 24 and 25 are positioned.

The numerals 28 and 29 represent respectively the first and the second supporting poles provided between the first magnetic circuit 26 and the second magnetic circuit 27.

The numerals 30 and 31 represent respectively the first and the second tracking leaf springs each of which is attached to each of the first and the second supporting poles 28 and 29 and is flexible toward the tracking direction.

The numeral 32 is a relay member attached on facing surfaces on the other ends of the first and the second tracking leaf springs and thus connecting the first tracking leaf spring and the second tracking leaf spring.

The numerals 33 and 34 represent respectively the first focusing leaf spring and the second focusing leaf spring one end of each of which is attached to relay member 32 and the other ends of which are attached respectively to the upper and lower surfaces of lens holder 22, and are flexible toward the focusing direction. On the second focusing leaf spring 34, there is provided a cutout for preventing interference with the first and the second supporting poles 28 and 29, and the first and the second tracking leaf springs are arranged so that they may be located between the first focusing leaf spring 33 and the second focusing leaf spring 34.

Operations in the aforesaid structure will be explained next. When focusing, an electric current is supplied to focusing coils of the first and the second coils 24 and 25 from an unillustrated control circuit, upon which a thrust is generated in each of the first and the second coils 24 and 25 and thereby the lens holder 22 moves in the arrowed direction F in FIG. 1 against the resilience of focusing leaf springs 33 and 34. When the supply of an electric current is cut, the lens holder 22 returns to its original position.

Figure 2:
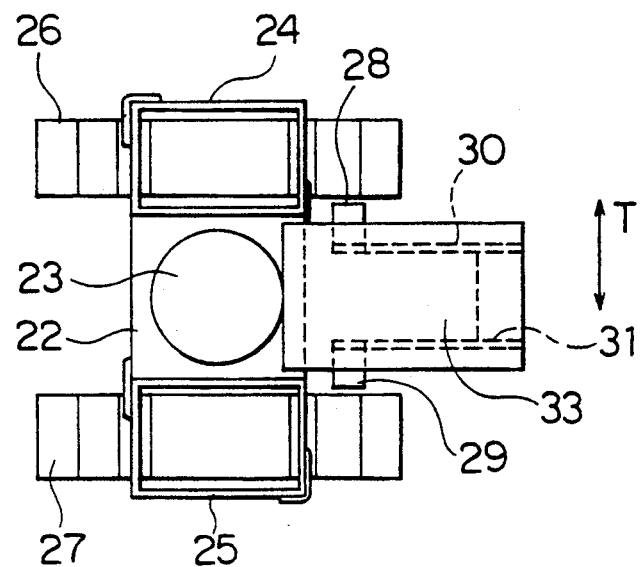
FIG. 2 is a structural top view of the example shown in FIG. 1.

Next, in the case of tracking, an electric current is supplied from an unillustrated control circuit to tracking coils of the first and second coils 24 and 25, upon which a thrust is generated in each of the first and the second coils 24 and 25, and thereby the lens holder 22 moves toward the arrowed direction T in FIG. 2 against the resilience of tracking leaf springs 30 and 31. When the supply of this electric current is cut, the lens holder 22 returns to its original position.

Due to the structure mentioned above, the first and the second supporting poles 28 and 29 do not interfere with the second focusing leaf spring and are positioned between the first and the second magnetic circuits 26 and 27. Therefore, it is possible to make the overall fine actuator small, while securing the lengths of tracking leaf springs 30 and 31.

In addition to that, the lengths of the first and the second tracking leaf springs 30 and 31 are almost the same as those in the example of a conventional device. Owing to this, it is possible to secure the stiffness mostly the same as that in a conventional fine actuator, even when the thickness of a tracking leaf spring is not reduced.

Figure 3:
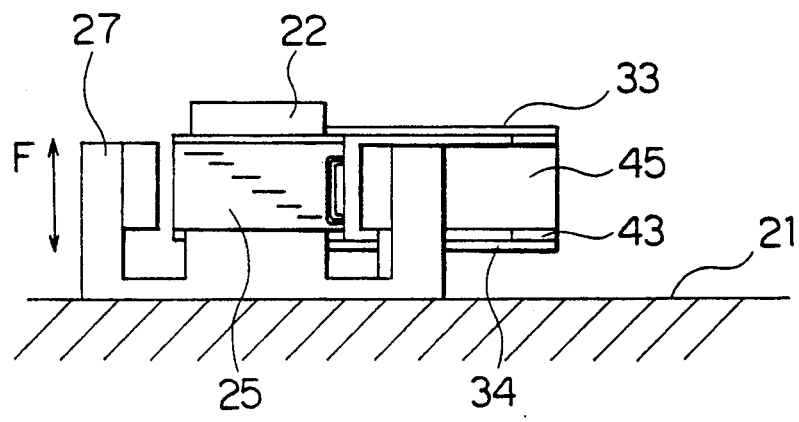
FIG. 3 is a structural front view illustrating the second example of the invention.
Figure 4:
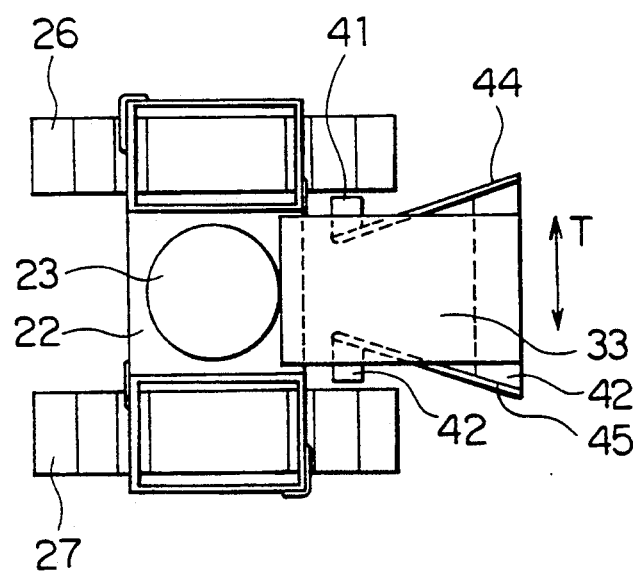
FIG. 4 is a structural top view of the example shown in FIG. 3.
Figure 5:
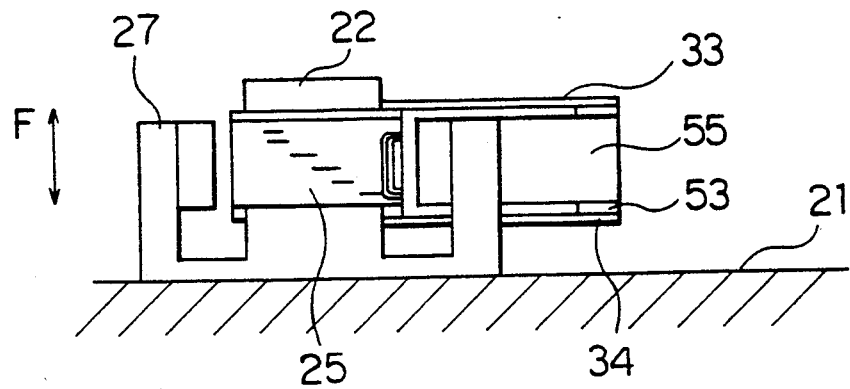
FIG. 5 is a structural front view of the third example of the invention.
Figure 6:
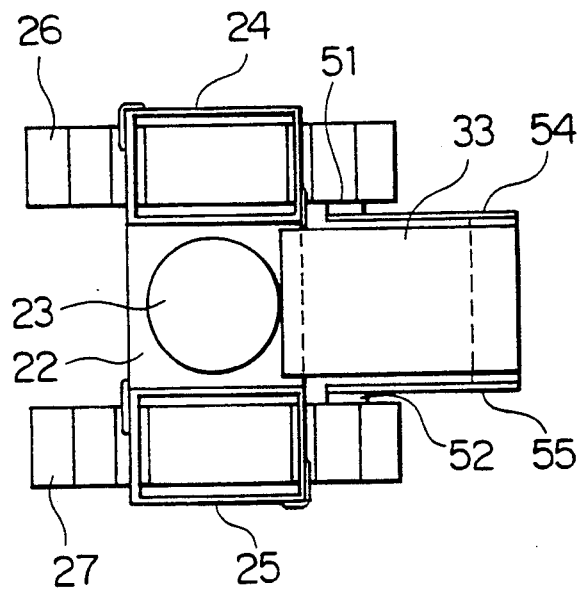
FIG. 6 is a structural top view of the example shown in FIG. 5.
Figure 7:
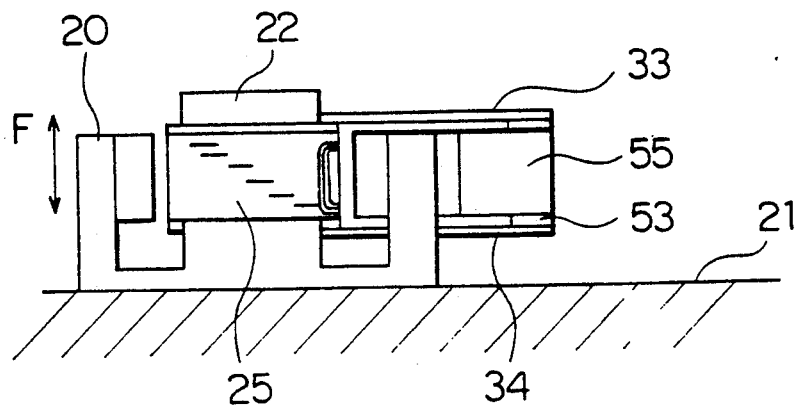
FIG. 7 is a structural front view illustrating the tracking in the third example of the invention.

Next, the second example of the invention will be explained, referring to FIG. 3 and FIG. 4. Incidentally, in these figures, parts or components identical to those in FIGS. 1 and 2 which correspond to the first example are given the same symbols as those in FIGS. 1 and 2, and explanations therefor will be omitted.

In the figures, the numerals 41 and 42 represent respectively the first and the second supporting poles provided between the first and the second magnetic circuits 26 and 27. On the second focusing leaf spring 34, there is formed a cutout to prevent interference with the first and the second supporting poles 41 and 42.

The numeral 43 is a relay member attached to the other end of the first focusing leaf spring 33 and to the other end of the second focusing leaf spring 34. The numerals 44 and 45 represent the first and the second tracking leaf springs one end of each of which is attached to relay member 43 and the other ends of which are attached respectively to the first and the second supporting poles 41 and 42, and are located to form an inverted letter V when viewed from the top, and further, their portions near the first and the second supporting poles 41 and 42 are positioned between the first and the second focusing leaf springs 33 and 34.

Even in the case of the structure mentioned above, it is possible to obtain the effect similar to that in the first example.

Next, the third example of the invention will be explained, referring to FIG. 5 through FIG. 8. Parts or components identical to those in the first example in FIGS. 1 and 2 are given the symbols same as those in FIGS. 1 and 2, and their explanations will be omitted.

Figure 8:
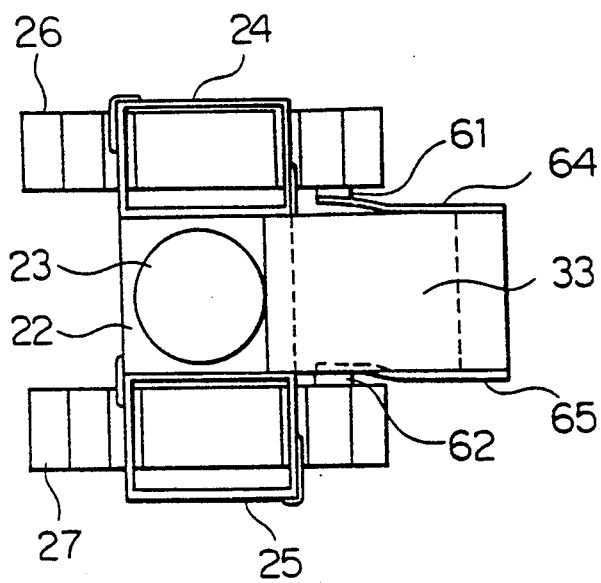
FIG. 8 is a structural top view of the tracking in the third example of the invention shown in FIG. 7.
Figure 9:
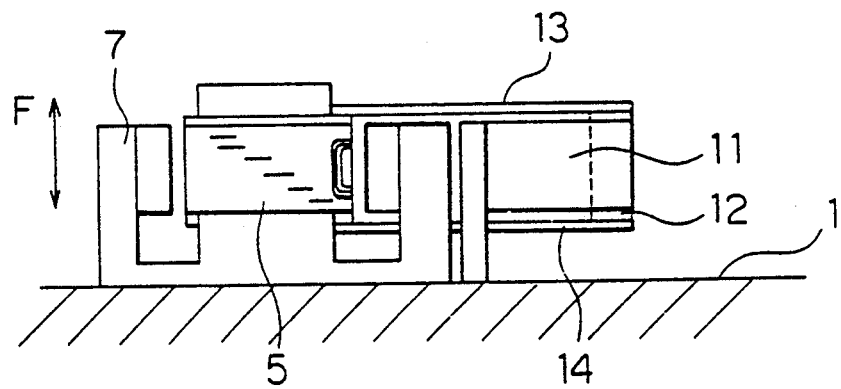
FIG. 9 is a structural front view of a conventional fine actuator.
Figure 10:
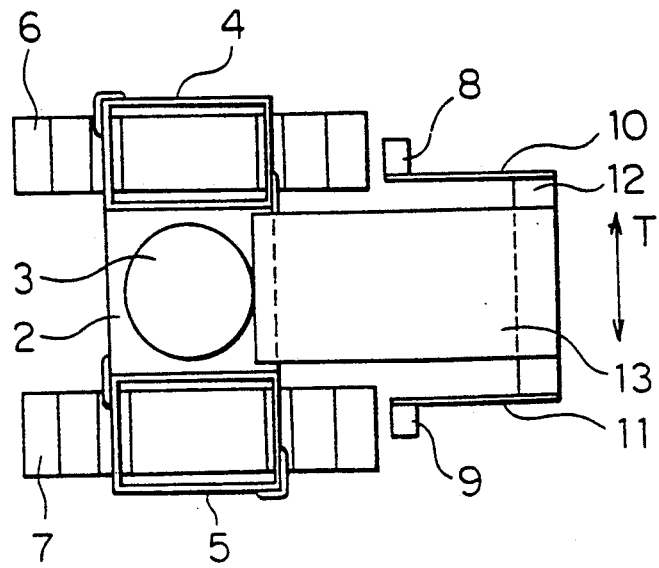
FIG. 10 is a structural top view of the conventional fine actuator shown in FIG. 9.

In the figures, the numerals 51 and 52 represent respectively the first and the second supporting poles attached respectively on the facing surfaces of the first magnetic circuit 26 and the second magnetic circuit 27. The numeral 53 is a relay member attached to other ends of the first and the second focusing leaf springs 33 and 34. The numerals 54 and 55 represent respectively the first and the second tracking leaf springs one end of each of which is attached to the relay member 53 and the other ends cf which are attached respectively to the first and the second supporting poles. In the case of tracking, a part of either one of the first and the second tracking leaf springs 54 and 55 is positioned between the first focusing leaf spring 33 and the second focusing leaf spring 34 as shown in FIG. 8.

Even in the case of the structure mentioned above, it is possible to obtain the effect similar to that in the first example.

As described above, it is possible to realize a small-sized fine actuator, according to the first example through the third example of the invention.

Figure 11:
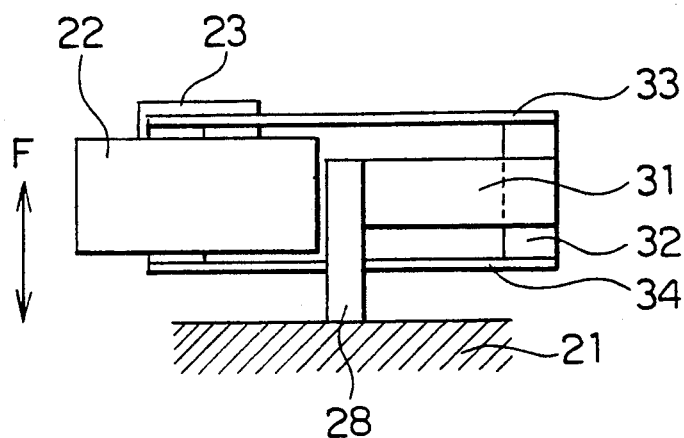
FIG. 11 is a structural front view illustrating the fourth example of the invention.
Figure 12:
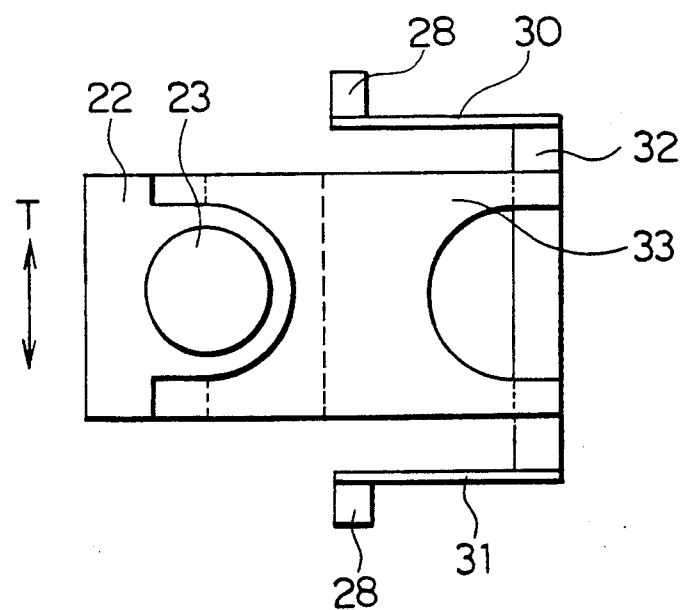
FIG. 12 is a structural top view of the fourth example of the invention shown in FIG. 11.

Next, the fourth example will be explained. In FIGS. 11 and 12, the numerals 33 and 34 represent respectively the first and the second focusing leaf springs one end of each of which is attached to the relay member 32 and the other ends of which are attached to the point in the vicinity of the center of gravity of the lens holder 22, and are flexible toward the focusing direction. Each of these focusing leaf springs 33 and 34 is provided with similar semicircular cutouts on its end at lens holder 22 side and on its end at relay member side, resulting in the symmetrical form at both ends.

In the structure mentioned above, other ends of focusing leaf springs 33 and 34 are attached to the point in the vicinity of the center of gravity of the lens holder 22. Therefore, it is possible to secure the sufficient length of the focusing leaf spring.

Further, since each of focusing leaf springs 33 and 34 is provided with cutouts in similar shape at both end portions, the focusing leaf spring does not interfere with objective lens 23 and stiffness at each of both end portions is reduced, and thus the high-order resonance is inhibited.

Figure 13:
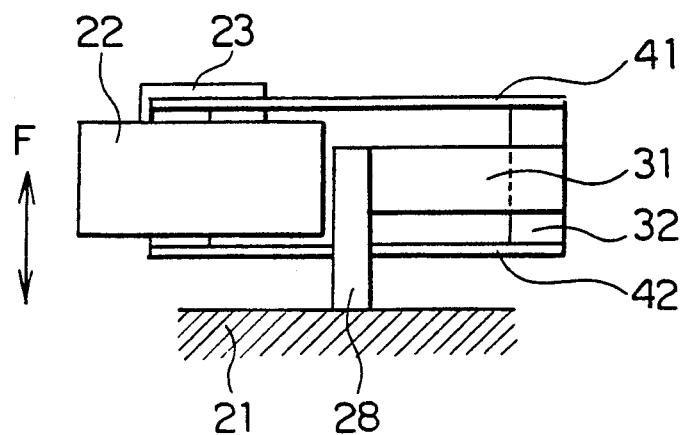
FIG. 13 is a structural front view illustrating the fifth example of the invention.
Figure 14:
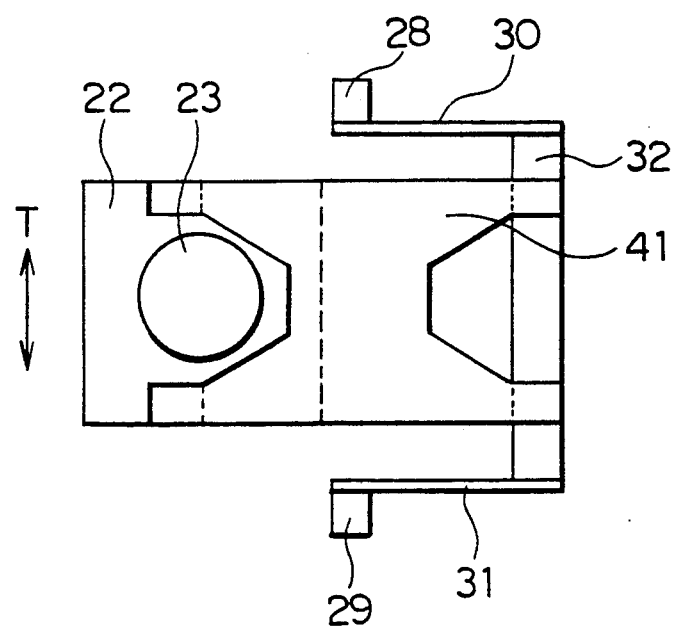
FIG. 14 is a structural top view of the fifth example shown in FIG. 13.

Next, the fifth example of the invention will be explained, referring to FIGS. 13 and 14. Parts or components identical to those in the first example shown in FIGS. 11 and 12 are given the same symbols as those in FIGS. 11 and 12, and explanations therefor will be omitted.

In the present example, portions different from those in the fourth example are the first and the second focusing leaf springs 41 and 42. One end of each of these focusing leaf springs 41 and 42 is also attached to the relay member 32 and the other ends of them are also attached to the point in the vicinity of the center of gravity of the lens holder 22, and these focusing leaf springs are flexible toward the focusing direction. Each of these focusing leaf springs 41 and 42 is provided with similar hexagonal cutouts on its end at lens holder 22 side and on its end at relay member side, resulting in symmetrical form at both ends.

Figure 15:
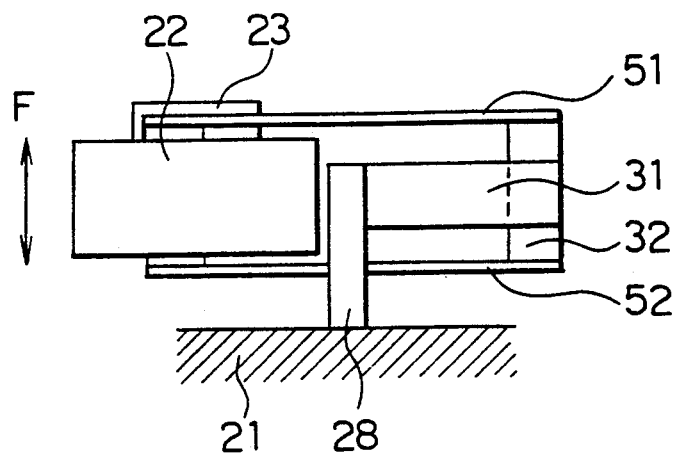
FIG. 15 is a structural front view illustrating the sixth example of the invention.
Figure 16:
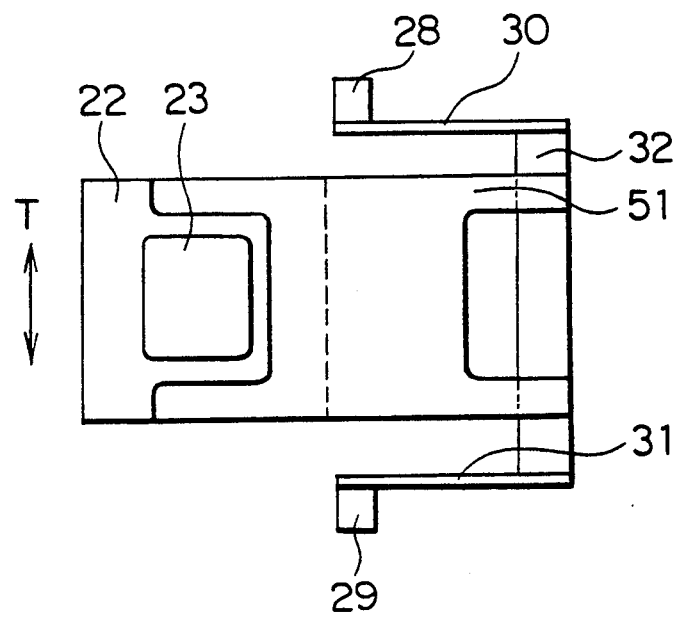
FIG. 16 is a structural top view of the sixth example shown in FIG. 15.

Next, the sixth example of the invention will be explained, referring to FIGS. 15 and 16. Parts or components identical to those in the fourth example shown in FIGS. 11 and 12 are given the same symbols as those in FIGS. 11 and 12, and explanations therefor will be omitted.

In the present example, the portions different from those in the fourth example are the first and the second focusing leaf springs 51 and 52. One end of each of these focusing leaf springs 51 and 52 is also fixed to the relay member 32 and the other ends of them are also attached to the point in the vicinity of the center of gravity of the lens holder 22, and these focusing leaf springs are flexible toward the focusing direction. Each of these focusing leaf springs 51 and 52 is provided with similar square cutouts on its end at lens holder 22 side and on its end at relay member side, resulting in symmetrical form at both ends.

Even in the case of the present example, it is possible to obtain the effect similar to that in the first example.

Figure 17:
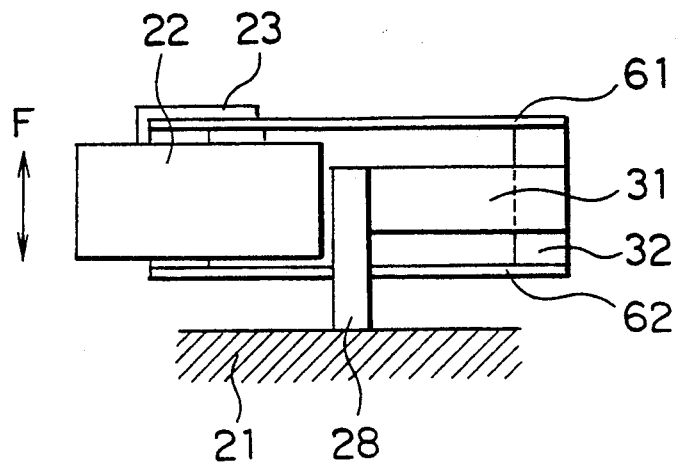
FIG. 17 is a structural front view illustrating the seventh example of the invention.
Figure 18:
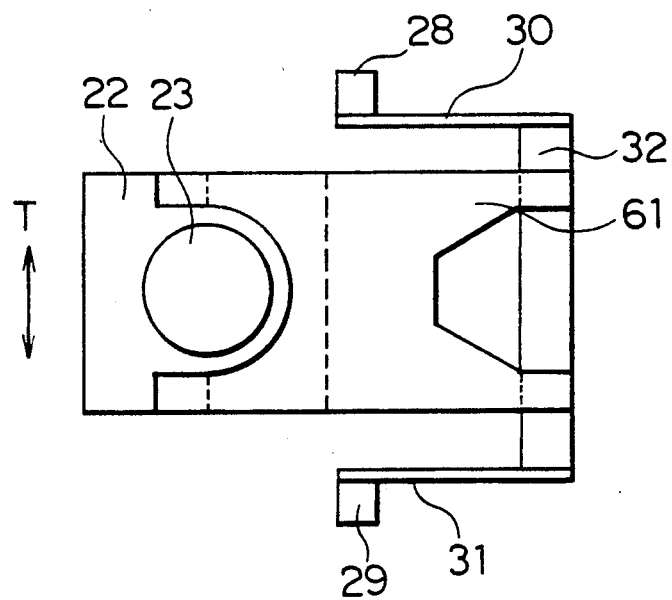
FIG. 18 is a structural top view of the seventh example shown in FIG. 17.
Figure 19:
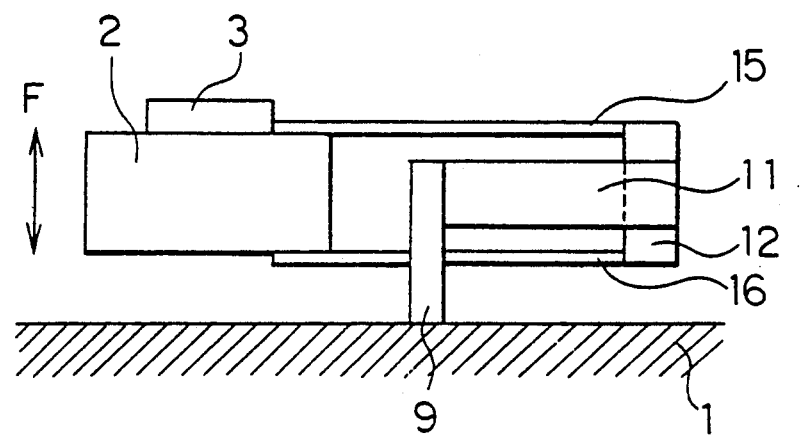
FIG. 19 is a structural front view of the second example of a conventional fine actuator.
Figure 20:
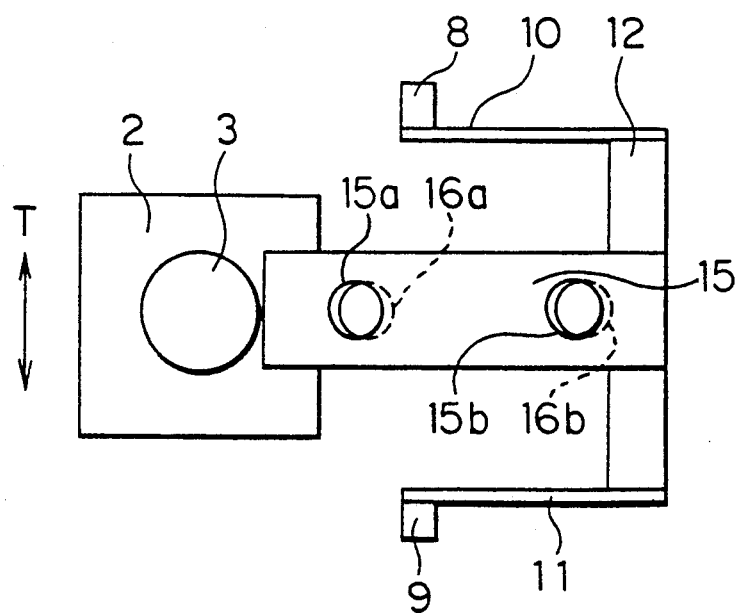
FIG. 20 is a structural top view of the second example of a conventional fine actuator shown in FIG. 19, FIG. 21 (a) is a front view showing the structure of the eighth example of the invention, FIG. 21 (b) is a side view of the eighth example, FIG. 22 (a) is a principle diagram of the state wherein an objective lens unit is inclined against an optical disk and FIG. 22 (b) is a principle diagram of the state wherein the objective lens unit is corrected to its normal position.

Next, the seventh example of the invention will be explained as follows, referring to FIGS. 17 and 18. Parts or components in FIGS. 17 and 18 identical to those in the fourth example are given the same symbols as those in FIGS. 11 and 12, and their explanations will be omitted.

In the present example, portions different from the first example are the first and the second focusing leaf springs 61 and 62. One end of each of these focusing leaf springs 61 and 62 is also attached to relay member 32 and other ends of them are attached to the point in the vicinity of the center of gravity of the lens holder 22, and these focusing leaf springs are flexible toward the focusing direction. At the lens holder 22 side on each of focusing leaf springs 61 and 62, there is formed an almost semicircular cutout, and at the relay side thereon, there is formed a hexagonal cutout.

Even in the present example, it is possible to obtain an effect similar to that in the fourth example.

As described above, according to the fourth example through the seventh example, it is possible to realize a small-sized fine actuator.

The invention will be explained as follows based on the eighth example shown in the attached drawings.

Figure 21A:
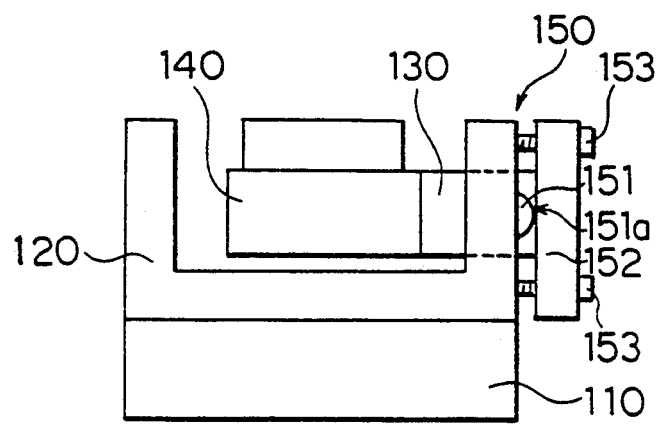
Figure 21B:
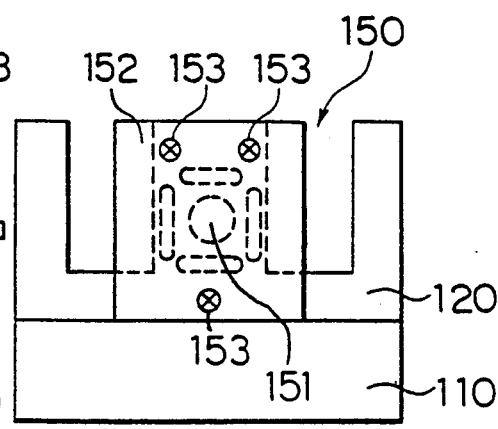
Figure 22A:
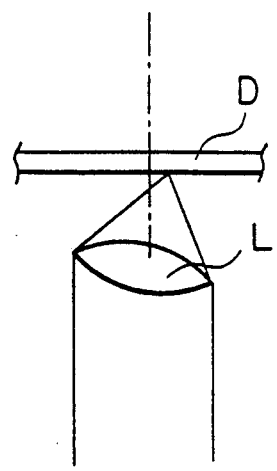
Figure 22B:
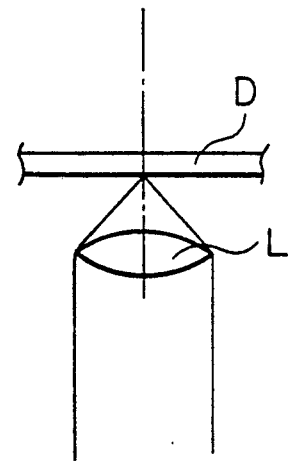
Figure 23:
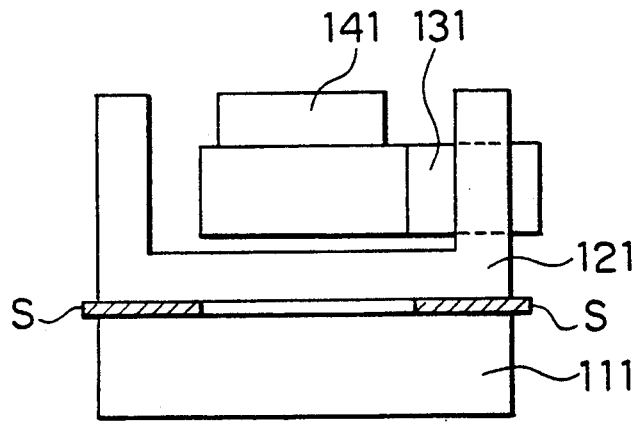
FIG. 23 represents a conventional device wherein a spacer system is employed.
Figure 24:
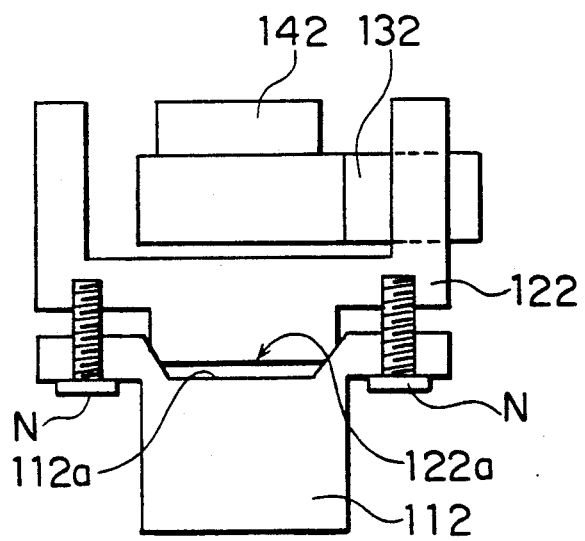
FIG. 24 represents a conventional device wherein a screw-tightening system is employed.

FIG. 21 (*a*) is a front view showing an overall structure of the device of the invention, FIG. 21 (*b*) is a side view of the device, FIG. 22 (*a*) is a principle diagram showing an objective lens unit inclined against an optical disk, FIG. 22 (*b*) is a principle diagram showing the objective lens unit corrected to its normal position, FIG. 23 is a conventional device employing a spacer system, and FIG. 24 is a conventional device employing a screw-tightening system.

FIG. 21 represents a head portion of an optical disk device of the invention, and the head portion is constructed with optical unit 110 as a base and is positioned near the surface of optical disk D. The optical unit 110 is coupled optically with objective lens unit 140, and when reading, it guides reflected light from a track of optical disk D in the following sequence and transmits it to a signal processing circuit system (not shown).

Objective lens L→Yoke opening→Optical unit When writing, light transmission is conducted in the following sequence so that predetermined information can be written.

Signal generating circuit (not shown)→Optical unit-→Yoke opening→Objective lens L→Optical disk D.

The numeral 120 is a yoke which is provided with a magnetic driving circuit that drives magnetically an induction coil of objective lens unit 140 to cause it to follow in X direction (track servo direction) and Z direction (focus servo direction), and is fixed on the top surface of optical unit 110 by means of adhesive or the like.

The numeral 130 is a supporting member, and supporting member 130 is composed of a pair of thin plates movable freely only in X direction and a pair of thin plates movable freely only in Z direction are holding objective lens unit 140. Since inclination adjusting means 150 is positioned between the supporting member 130 and aforesaid yoke 120, it is possible to adjust, through the supporting member 130, the inclination of objective lens unit 140 against yoke 120. And two pairs of thin plates are fixed to the square base board 152 through yoke 120.

The inclination adjusting means 150 is composed of hemispherical protrusion 151 protruded on the side of yoke 120, square base board 152 that is in point-contact with the protrusion 151 at contact point 151a in the center, and three screws 153 which fix the square base board 152 on the yoke 120. The screws 153 are positioned at three apexes of an almost equilateral triangle whose center is at center portion 152a of the square base board 151a and each of the three screws can be controlled independently in terms of tightening force. Thus, the square base board 152 can be inclined in any direction with contact point 151a that is in contact with semispherical protrusion 151 as a supporting point, by controlling properly the tightening force for the screws 153.

In the example mentioned above, when supporting member 130 is screwed on the yoke 120 mounted on optical unit 110 through base board 152 of inclination adjusting means 150, the base board 152 inclines against the hemispherical protrusion 151, depending on the degree to which the three screws 153, 153 and 153 are tightened. Therefore, it is possible to align an optical axis of objective lens L with optical disk D by controlling the tightening force for screws 153 while detecting, by a detecting means, the spot images which have passed through objective lens unit 140. In this case, there is no fear that screws 153 cause mechanical stress on the optical unit 110.

As described above, an optical disk device in the eighth example of the invention wherein a yoke mounted on the top of an optical unit is provided with a head portion that supports, through a supporting member movable freely only in two focusing directions, an objective lens unit equipped with an induction coil that follows a magnetic driving circuit provided on the yoke, is characterized in that an adjusting means is provided between the aforesaid supporting means and the yoke. Therefore, the objective lens can be aligned by simple screw-tightening operations, and no stress is caused on the optical unit.

As a result of the foregoing, it is possible to provide an optical disk device equipped with a reading portion that requires only simple adjustment and is highly reliable.

What is claimed is:

1. An optical head for optically writing data onto a recording medium and reading said data from said recording medium, comprising:
    means for holding an optical lens;
    means, connected to said holding means, for driving said holding means in a vertical direction or in a horizontal direction;
    means, having a plurality of first spring members, for elastically supporting said holding means with respect to movement in said horizontal direction; and
    means, having an area held between a plurality of second spring members, for elastically supporting said holding means with respect to movement in said vertical direction;
    wherein at least a part of said plurality of first spring members is located within said area.

2. An optical head for optically writing data onto a recording medium and reading said data from said recording medium, comprising:
    means for holding an optical lens;
    means, connected to said holding means, for driving said holding means in a vertical direction or in a horizontal direction;
    means, having a plurality of first leaf spring members, for elastically supporting said holding means with respect to movement in said horizontal direction; and
    means, having an area held between a plurality of second leaf spring members, for elastically supporting said holding means with respect to movement in said vertical direction;
    wherein at least a part of said plurality of first spring member moves into said area when said holding means moves in said horizontal direction.

3. An optical head for optically writing data onto a recording medium and reading said data from said recording medium, comprising:
    means for holding an optical lens;
    means, connected to said holding means, for driving said holding means in a vertical direction or in a horizontal direction;
    means, having a plurality of first leaf spring members, for elastically supporting said holding means with respect to movement in said horizontal direction;
    means, having a plurality of second leaf spring members, for elastically supporting said holding means with respect to movement in said vertical direction wherein said second leaf spring members are connected to said holding means; and
    means for connecting to said first leaf spring members and said second leaf spring members;
    wherein said second leaf spring members have a cutout at a side of said connecting means, and have a cutout at a side of said holding means.

4. An optical head for optically writing data onto a recording medium and reading said data from said recording medium, comprising:
    means for holding an optical lens;
    means, located on a side of said holding means, for driving said holding means in a vertical direction or in a horizontal direction;
    means, having a plurality of first leaf spring members, for elastically supporting said holding means with respect to movement in said horizontal direction, said first leaf spring member being fixed at an end thereof to a fixing member;

means, including a plurality of second leaf spring members, for elastically supporting said holding means with respect to movement in said vertical direction wherein said second leaf spring members are connected to said holding means wherein at least a part of said fixing member is located between said driving means and said second leaf spring members; and means for connecting said first leaf spring members and said second leaf spring members.

5. An optical head for optically writing data onto a recording medium and reading said data from said recording medium, comprising:

means for holding an optical lens;

means for driving said holding means in a vertical direction or in a horizontal direction;

means for electrically supporting said holding means with respect to movement in said vertical or horizontal direction, said supporting means including a spring member one end of which is connected to said holding means and a fixing base to which the other end of said spring member is fixed;

a stationary member; and means for adjusting a positional relation of said supporting means relative to said stationary member; wherein said adjusting means including a hemispherical shape member fixed to one of said fixing base and said stationary member to provide a point-contact between said fixing base and said stationary member and a plurality of screw members for adjusting an angle of said fixing base to said stationary member.

6. An optical head of claim 5, wherein said driving means drives said holding means in vertical direction or in a horizontal direction for fine adjustment of an optical axis of said optical lens relative to the recording medium and said adjusting means adjusts the inclination of said supporting means relative to said driving means for gross adjustment of said optical axis of said optical lens relative to the recording medium.

7. An optical head of claim 5, further comprising means for detecting a light emanating from said optical lens wherein said detecting means is fixed to said driving means.

* * * * *